Oct. 18, 1966 — W. F. KYRYLUK — 3,279,457
SOLAR HEAT CONCENTRATOR
Filed Dec. 28, 1964

INVENTOR
WILLIAM F. KYRYLUK

United States Patent Office 3,279,457
Patented Oct. 18, 1966

3,279,457
SOLAR HEAT CONCENTRATOR
William F. Kyryluk, 362 W. 18th Ave.,
Vancouver, British Columbia, Canada
Filed Dec. 28, 1964, Ser. No. 421,469
6 Claims. (Cl. 126—270)

My invention relates to a device which is designed to collect and concentrate solar energy.

In my United States Patent No. 3,137,125 dated June 16, 1964 for Solar Motor I disclosed a particularly efficient solar heat collector. The object of the present invention is to incorporate such a collector into a heat concentrating device whereby solar energy may be collected from a large exposed area and brought by step-down conduction to a small area where it can be usefully employed.

Solar energy normally is gathered and focused by means of parabolic mirrors or convex lenses but both these devices are required to be operated by rather complex sun-following mechanisms if they are to be fully automatic. A further object of this invention is to provide a spherical concentrator which will function with maximum efficiency without the necessity of being turned towards the sun.

These and other objects and features of my invention will appear in the following specification and be shown in the accompanying drawings.

Figure 1:
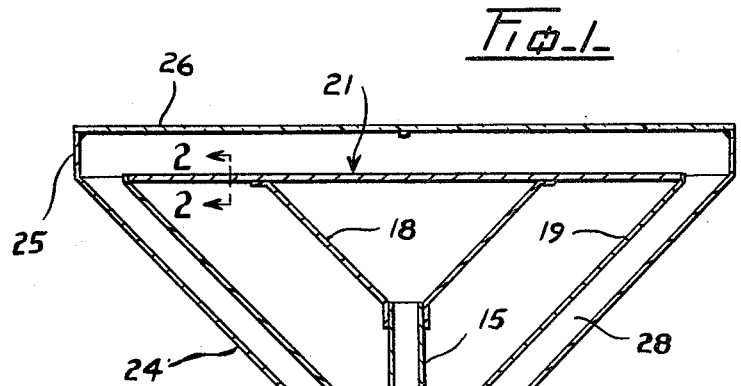
FIGURE 1 is a vertical section of the invention.
Figure 2:
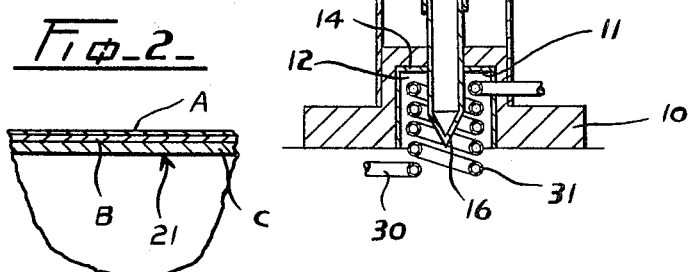
FIGURE 2 is a detail section taken on the line 2—2 of FIG. 1.

Referring to the embodiment of FIGS. 1 and 2, it will be seen that the concentrator consists of a base 10 and that the underside of the base has a recess 11. This recess provides the concentrator with an oven 12 which may be lined as at 14 with copper or other suitable material.

The top wall of the base 10 supports a copper tube 15 with its closed and pointed lower end 16 projecting into the oven 12. The upper end of the vertical tube 15 is connected to the small end of an inner wall 18. This wall is in the form of an inverted cone which I prefer to construct of very thin aluminum.

An intermediate wall 19 is provided within the concentrator, this wall also being in the shape of an inverted cone formed of a suitable thin gauge aluminum. The lower end of the wall 19 embraces and is secured to the tube 15 near the top of the base 10.

Supported on the upper edges of the walls 18 and 19 is a collector 21. The collector is a laminated plate designed to absorb the sun's radiant energy and transform it into useful heat energy. Such a device has been thoroughly described in my United States Patent No. 3,137,125 but briefly the collector is made up of layers A, B and C, see particularly FIG. 2. The inner layer C is of extremely thin aluminum which is a good conductor of heat. Centre layer B is a semiconductor of heat and is formed of carbon, lamp black and lacquer which are suitably mixed and applied to the layer C as a thin coat. Outer layer A is a poor conductor of heat and consists of a spray coat of varnish, lacquer, enamel or plastic, the coat being extremely thin and transparent.

Secured to base 10 is a funnel-shaped outer wall 24 having a vertically disposed rim 25. Preferably the wall 24 is formed of a suitable plastic which is a poor conductor of heat. Fitted to the rim 25 is a cover 26 consisting of a thin sheet of clear glass.

An air space 28 is defined between the walls 19 and 24 and also between the cover 26 and the collector 21. This dead air space serves to insulate the tube 15 and the walls 18 and 19 against loss of heat to the exterior of the concentrator. If necessary, this insulation may be augmented either by evacuating the air from the space 28 or by applying a coating of fibre glass to the outer surfaces of the copper rod and the two parallel aluminum walls supporting the collector.

The spacing between the walls 18 and 19 in relating to the diameter of the collector 21 is quite critical. I have experimented and found that if these walls are too far apart heat will be lost to the space therebetween. If they are too numerous and too close together some heat will be lost in maintaining the metal at a desired temperature level. For maximum efficiency I found that the spacing between the heat conducting walls should be a distance equal to approximately ¼ of the diameter of the collector.

Figure 3:
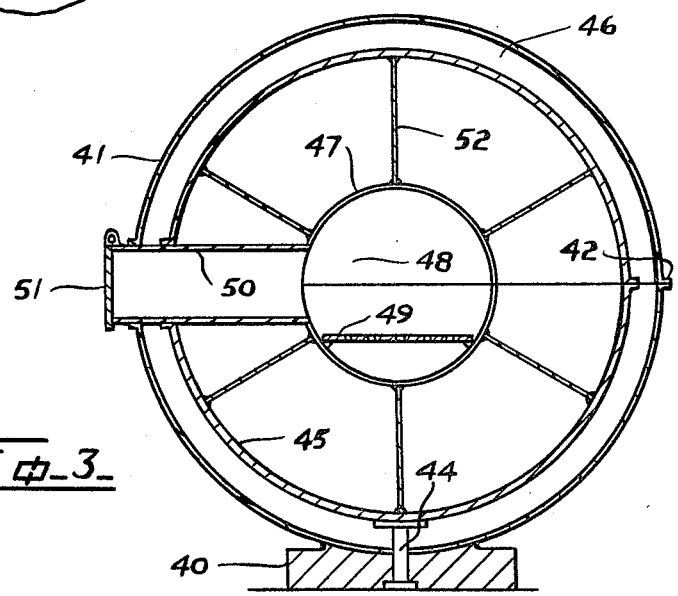
FIGURE 3 is a vertical section of a modification of the invention.

The modified form of the invention shown in FIG. 3 consists of a base 40 which supports a spherical outer wall 41. This wall is formed of plastic having poor heat conducting properties and for convenience in assembly said wall is made up of two halves which may be secured together as at 42.

The post 44 is fitted to the base 40 and mounted on this post is a collector 45. A dead air space 46 is formed between the wall 41 and the collector. The collector 45 is also a spherical two-part structure which is made up of the same three layers A, B and C as the laminated member 21.

Enclosed within the collector 45 is a hollow two-part sphere 47 of copper. This copper sphere defines an oven 48 which may be fitted with a rack 49. If desired, the inner surface of the oven may be lined with silver. A tube 50 of the same plastic material as the wall 41 connects the interior of the oven 48 with the exterior of the modified concentrator. The outer end of the tube 50 is closed by a door 51. Secured to the outer periphery of the sphere 47 are a number of suitably spaced annular bands 52 which extend radially outwards into contact with the layer C of the collector 45. The bands 52 are formed of aluminum or other suitable metal, the heat conductivity of which is lower than copper.

A typical example of the use to which the main embodiment of the concentrator might be put is as a supplementary source of heat for a water heating system. In such a case the system would include a pipe 30 in which a coil 31 is formed. The coil projects into the oven 12 with the pointed end 16 of the copper tube extending down into the centre of the coil.

In operation, the sun's radiant energy readily passes through the cover 26 and strikes the collector 21. The sun's rays pass through the outer layer A and in the centre layer B are converted to heat energy. Layer B, being a semiconductor of heat, warms very quickly and fairly evenly throughout and transmits its heat to the inner layer C. Since layer A is a relatively poor conductor of heat it will restrict heat flow in an upward direction and achieve what might be referred to as a greenhouse effect with the heat always moving through the collector in a downward direction. The heat gathered by the collector 21 is transferred to the walls 18 and 19.

Heat flows down the aluminum walls by normal conduction and is transmitted to the copper tube 15. The copper tube, being a better conductor of heat than the aluminum, urges the heat to continue its downward flow to the point 16 whereupon the oven 12 assumes substantially the same temperature as said point. The direction initially given to the heat flow by the collector 21 is maintained by the conductors 18, 19 and 15. Since the conductors progressively decrease in size as well the heat is also concentrated or focused within the oven. In this manner, the coil 31, and in turn the water flowing therethrough, is preheated by the sun's rays and may be brought up to the desired temperature by the main heat source of the heating system.

As a test of the efficiency of the above described concentrator I placed the device in the sun and during a period of seven hours obtained the following temperature readings:

| Time | Ambient Temp., ° F. | Oven Temp., ° F. |
|---|---|---|
| 9 A.M. | 74 | 132 |
| 10 | 78 | 160 |
| 11 | 83 | 185 |
| 12 | 87 | 200 |
| 1 P.M. | 91 | 202 |
| 2 | 90 | 198 |
| 3 | 89 | 185 |
| 4 | 86 | 163 |

From the above table I believe it will be evident that this simplified model of the concentrator can produce appreciable amounts of heat which would be suitable as a supplementary heat source. A more advanced model of the unit, using the same step-down principle of conduction, should be capable of heating water, cooking or generating electricity when a thermo-electric cell is introduced into the oven.

The present concentrator has been described as having two conductors to direct heat from the collector to the oven but obviously additional conductors could be used if this was warranted by the distance the heat was required to travel. It is essential only that the lowermost conductor have better heat conductivity than the next adjacent conductor and that the conductivity should decrease from the oven up to the collector. I have elected to use aluminum and copper for the two-stage step-down conduction of heat but if cost and other factors do not enter into the construction of the concentrator other combinations of metals may be used, i.e., copper and silver.

The operation of the modified form of the invention is substantially as above described. An object entered through the tube 50 and placed on the rack 49 within the oven will be heated by the sun's energy collected and focused by the spherical concentrator. For example a thermo-electric pile within the oven would be energized to produce electricity.

What I claim is:

1. A solar heat concentrator comprising a base, a large area collector supported by the base to receive solar heat, said collector having inner, centre and outer layers which respectively are good, fair and poor conductors of heat whereby solar heat is absorbed and directed inwardly by said layers, a small volume oven carried by the base and being spaced from the collector, a first conductor in heat transfer relation to the oven, a second conductor connecting the first conductor to the inner layer of the collector, the heat conductivity of the first conductor being higher than that of the second conductor whereby solar heat gathered by the collector is directed towards and concentrated within the oven.

2. A solar heat concentrator comprising a base, a collector supported by the base to receive solar heat, said collector having a spherical wall consisting of an inner, a centre and an outer layer, said inner, centre and outer layers respectively being good, fair and poor conductors of heat whereby solar heat is absorbed and directed inwardly by said layers, a central conductor enclosed within the collector, an oven within the central conductor, a tube extending through the collector and the cenralt conductor to provide access to the interior of the oven, a plurality of radial conductors connecting the central conductor to the inner layer of the collector, said central conductor being a better conductor of heat than the radial conductors.

3. Structure as claimed in claim 2, and a spherical outer wall enclosing the collector, said outer wall being a clear, transparent material and being spaced from the collector to define an insulating dead air space.

4. Structure as claimed in claim 1, and a third conductor connecting the first conductor to the inner layer of the collector, said first conductor being a tube suppored by the base with its lower end extending into the oven, said second and third conductors being funnel-shaped walls and poorer conductors of heat than the tube.

5. Structure as claimed in claim 4, and means for insulating the tube and funnel-shaped walls.

6. Structure as claimed in claim 5, and a sheet of glass supported above the collector in spaced and parallel relation thereto.

References Cited by the Examiner

UNITED STATES PATENTS

| 681,095 | 8/1901 | Baker | 126—270 |
| 1,074,219 | 9/1913 | Skiff | 126—270 |
| 3,137,125 | 6/1964 | Kyryluk | 60—26 |
| 3,156,234 | 11/1964 | Steinberg | 126—270 |

FOREIGN PATENTS

| 349,366 | 5/1931 | Great Britain. |

CHARLES J. MYHRE, *Primary Examiner.*